July 24, 1934.　　　J. L. WOODBRIDGE　　　1,967,800
APPARATUS FOR MAINTAINING THE PROPER LIQUID LEVEL
IN THE CELLS OF A STORAGE BATTERY
Filed July 26, 1930
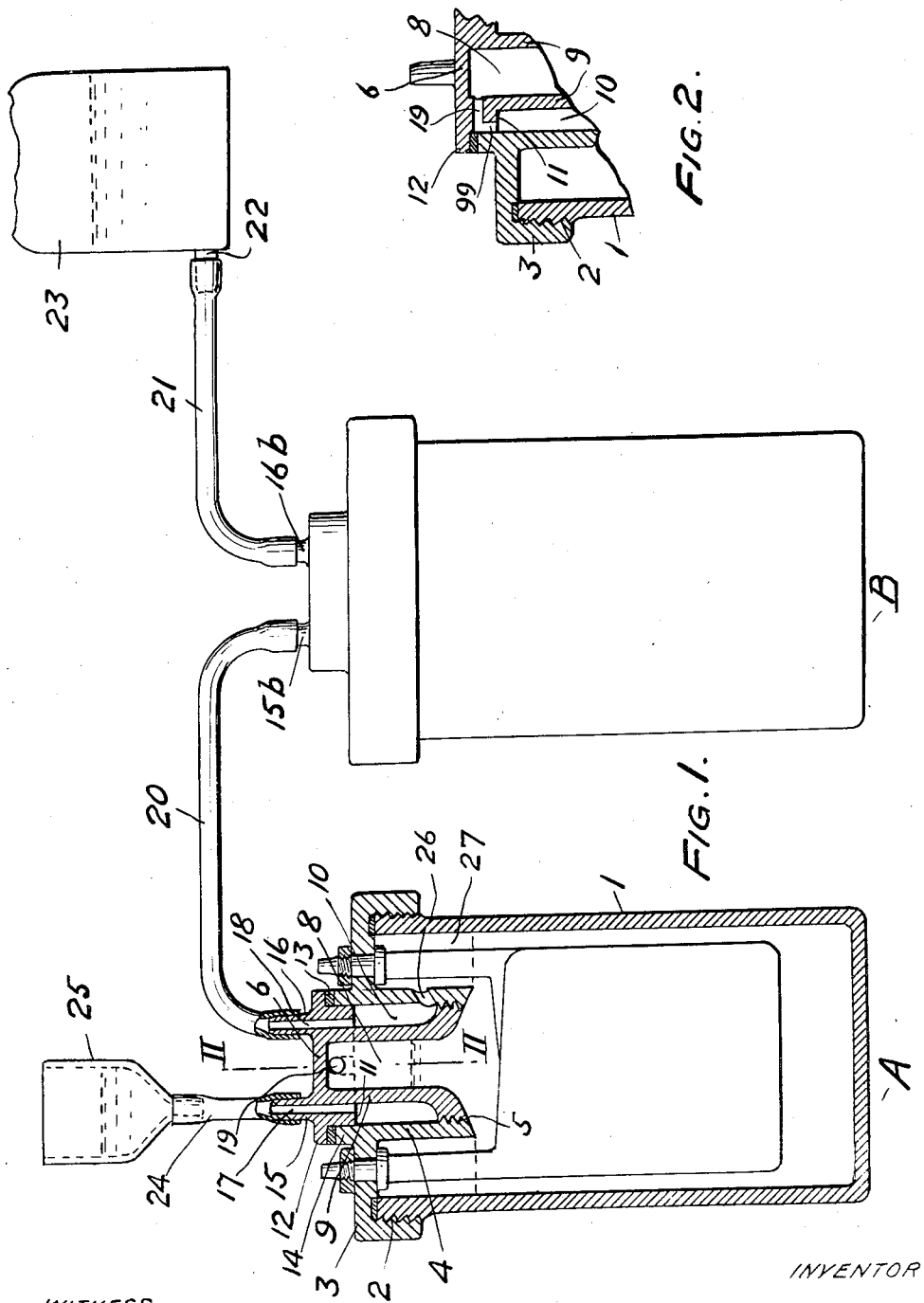
INVENTOR
Joseph Lester Woodbridge
BY
Augustus B. Stoughton.
ATTORNEY.
WITNESS:

Patented July 24, 1934

1,967,800

UNITED STATES PATENT OFFICE 1,967,800

APPARATUS FOR MAINTAINING THE PROPER LIQUID LEVEL IN THE CELLS OF A STORAGE BATTERY

Joseph Lester Woodbridge, Philadelphia, Pa., assignor to The Electric Storage Battery Company, Philadelphia, Pa., a corporation of New Jersey Application July 26, 1930, Serial No. 470,883

4 Claims. (Cl. 137—63)

My invention relates to apparatus for supplying water to the cells of a storage battery to maintain the level substantially constant by replenishing the loss due to the decomposition of the electrolyte by the charging current passing through the cells.

One object of my invention is to provide apparatus in which a reservoir of fresh water supplies the necessary water to maintain the level in the cells of the battery as it is required without permitting the escape or wastage of any surplus water from the system and without permitting the acid in the electrolyte to be transferred from cell to cell or from the cells to the reservoir. Another object of the invention is to provide a system for automatic filling, which shall permit the escape of gases developed in the cells without interfering with the filling operation. Another object of the invention is to provide for filling a number of cells in a storage battery from a single reservoir with a minimum amount of piping for carrying the liquid to the various cells. Another object of the invention is to provide a simple and inexpensive design of cover vent and filling plug for use in connection with a filling system of the type disclosed.

My invention will be better understood by reference to one embodiment thereof covered by the following description in connection with the accompanying drawing in which, Figure 1 shows in vertical elevation and partial section two cells of a storage battery with appropriate reservoir and connections for carrying out my invention, and Figure 2 is a vertical cross section on line 2—2 of Figure 1.

In the drawing two cells of a storage battery identical in design and construction are shown respectively at A and B. In cell A, 1 represents the container, which may be of glass and cylindrical in form, having external screw threads 2 at the top adapted to be engaged by similar internal threads of the depending rim of the cover 3. This cover is provided with a vent opening defined by a cylindrical barrel 4, this barrel being internally threaded near its lower end as shown at 5. Into this barrel and engaging with the screw threads 5 is shown the filling and venting plug 6, which has a central cylindrical chamber 8 surrounded by a cylindrical wall 9, whose outside diameter is less than the inside diameter of the vent opening of the cover, thus providing for an annular space 10 between the two. Through the wall 4 near the bottom of the annular space 10 is an opening 26 providing communication between the annular space 10 and the interior of the cell. The vent plug 6 is shouldered near the top at 11, so as to closely fit into the opening of the cover at the top and a second shoulder 12 is provided, which seats on a soft rubber gasket 13 resting on the boss 14 on the top of the cover, thus forming a tight seal between the vent plug 6 and the cover.

Projecting from the top of the vent plug 6 are shown two cylindrical ducts 15 and 16, providing tubular passages 17 and 18 communicating below with the annular space 10. An opening 19 is shown from the top of the chamber 8 through the cylindrical wall 9, opening by means of a vertical groove 99 in the outer surface of the shoulder 11 into the annular space 10. The duct 16 of cell A is connected with a corresponding duct 15b on cell B by a piece of rubber tubing 20. The duct 16b of cell B is connected by a piece of rubber tubing 21 with the spout 22 near the bottom of the reservoir 23, the reservoir being filled to any desired level with water.

The duct 15 of cell A is connected by a rubber tube 24 with a funnel shaped stand pipe or reservoir 25 so located that the level of the liquid in it may rise to the same height as that in the reservoir 23.

With this arrangement, so long as there is a supply of water in the reservoir 23, the level of the liquid in each of the cells will be maintained at a height just above the lower edge of the barrel 4. The ducts 15 and 16 and the connecting tubes 20, 21 and 24 as well as the annular spaces 10 in all of the cells will be filled with water except for bubbles of gas which may be developed in the cells during the charging period, which will pass through the various passages and escape from the reservoir 23 or the stand pipe 25. So long as the level of the liquid in the cells is above the lower edge of the barrel 4, no additional water will flow from the annular space 10 through the opening 26 into the cell because of the back pressure of the gas trapped in the space 27 between the barrel 4 and the wall of the container 1. This back pressure will however force the liquid in the cell up into the inner chamber 8 of the vent plug to a point where the head of the liquid in this chamber just balances the back pressure. Since the chamber 8 is in communication with the upper part of the annular space 10 through the openings 19 and 99, the pressure in this chamber and in the upper part of the space 10 will be the same. This pressure will be increased by the column of liquid in the space 10 so that the back pressure in the upper part of the cell in the space 27 will be greater than the pressure in the chamber 8 by an amount corresponding to the head of the liquid in the space 10. This excess of pressure will be balanced by the head of the liquid column rising into the chamber 8. Since the liquid in this column is electrolyte having a somewhat greater density than water while the liquid in the space 10 is water, the height of the column of liquid rising into the chamber 8 will be somewhat less than the height of water in the space 10.

As soon as the level of the electrolyte in one of the cells falls to a point below the lower edge of the barrel 4, bubbles of gas will escape from the space 27 in the top of the cell, passing under the edge of the barrel 4 and into the chamber 8, thus relieving the back pressure in the space 27 and permitting an additional supply of water to flow from the space 10 through the opening 26 into the cell until the level in the cell is restored.

It will be noted that the opening 26 extends upward toward the outer surface of the barrel 4, thus providing a gas trap which prevents gas from escaping from the space 27 back into the space 10 while liquid is flowing from the space 10 through the opening 26. Should this occur, the cell would be overfilled, the liquid rising in the space 27 up to the opening 26, at which point the acid in the electrolyte would mingle with the water in the space 10, and in the case of one of the intermediate cells in the battery, this acid would be carried over from one cell to the next, thus causing inequality in the concentration of the electrolyte in the different cells.

The arrangement shown in this drawing presents a number of distinct advantages. The reservoir 23 may be made of any convenient size to hold a sufficient amount of water to keep the batteries properly filled for any desired period of time. The surplus liquid does not run off but is retained until it is used. It is not necessary to run separate ducts from the reservoir to each cell but the cells may be connected by short pieces of rubber tubing running from cell to cell. There are no valves or other moving parts to prevent overfilling of the cells. The gases developed during charge may readily escape but the bubbles of gas pass through the pure water in the reservoir or the stand pipe, and should these bubbles carry a slight amount of entrained acid spray, this spray would be removed in passing through the water in the reservoir, so that there is no possibility of the escape of such spray into the atmosphere.

The construction of the cover and vent plug as herein shown is simple, and the parts can readily be molded of hard rubber or similar composition. The cover construction and vent plug require only two parts and in case of necessity or for convenience in taking hydrometer readings, the vent plug 6 can readily be removed and replaced. This operation can readily be performed without draining the liquid from the filling system by clamping the two rubber tubes, for example the tubes 20 and 21 on either side of the cell from which the plug is to be removed, whereupon these tubes can be slipped off from the ducts 15b and 16b and the vent plug unscrewed.

While in the drawing only two cells are shown, it will of course be understood that a number of cells may be connected in series with a reservoir at one end of the series and a stand pipe or the equivalent at the other end.

Having described my invention, what I claim and desire to secure by Letters Patent is:

1. A filling and venting structure for a battery cell having a closure and containing electrolyte comprising a cylindrical barrel extending vertically through the closure to the normal electrolyte level, and internally threaded at the bottom, a cylindrical filling plug flared at the bottom and externally threaded to engage the threads of the barrel, said filling plug having an upper shoulder adapted to seat on the upper edge of the barrel thus defining a closed annular space between the outer wall of the filling plug and the wall of the barrel, a filling duct passing through the wall of the barrel near the bottom of the closed annular space and communicating with the interior of the cell above the normal electrolyte level, a centrally located chamber in the filling plug open at the bottom into the interior of the cell and communicating at the top by a duct leading into the top of the closed annular space, and two ducts passing from the top of the closed annular space through the top of the filling plug.

2. A filling and venting structure for a battery cell having a closure and containing electrolyte, said structure comprising a barrel extending through the closure to the normal electrolyte level, a filling plug within said barrel defining a closed space between its external walls and the internal walls of the barrel, a filling duct communicating with said closed space and with the interior of the cell only above the normal electrolyte level, a chamber in the filling plug open at the bottom into the interior of the cell and communicating at the top by a duct leading into the top of the closed space, and two ducts passing from the top of the closed space through the top of the filling plug.

3. A filling and venting structure for a storage battery containing electrolyte, including in combination a plug adapted to cooperate with said battery to define a closed space, a passage from said closed space to the interior of said battery above the normal electrolyte level, a chamber in said plug communicating above with said closed space and communicating below with the interior of the battery at the normal electrolyte level, and ducts leading from the exterior of said plug to said closed space below the communication from said chamber to said closed space.

4. A filling and venting structure for a storage battery containing electrolyte including a plug adapted to cooperate with said battery to define a closed space, a passage adjacent the bottom of said closed space leading to the interior of said battery above the normal electrolyte level thereof, a chamber within said plug communicating below with the interior of said storage battery at the normal electrolyte level thereof and communicating above with said closed space, an inlet duct leading from the exterior of said plug to said closed space below the communication from said chamber to said closed space and above said passage, and an outlet duct leading from said closed space below the communication from said chamber to said closed space.

JOSEPH LESTER WOODBRIDGE.